United States Patent [19]

Blessing et al.

[11] Patent Number: 4,969,326
[45] Date of Patent: Nov. 13, 1990

[54] HOOP SHROUD FOR THE LOW PRESSURE STAGE OF A COMPRESSOR

[75] Inventors: William D. Blessing, Brookeville, Ind.; Richard W. Stickles, Cincinnati, Ohio

[73] Assignee: General Electric Company, Cincinnati, Ohio

[21] Appl. No.: 231,919

[22] Filed: Aug. 15, 1988

[51] Int. Cl.⁵ .............................................. F02K 3/04
[52] U.S. Cl. ..................................... 60/226.1; 60/909; 415/77; 416/193 R; 416/230
[58] Field of Search ................... 60/226.1, 262, 909; 416/193 R, 196 R, 230, 241 R, 241 A; 415/77, 69

[56] References Cited

U.S. PATENT DOCUMENTS

| | | | |
|---|---|---|---|
| 2,421,890 | 6/1947 | Johansson | 416/193 R |
| 2,971,745 | 2/1961 | Warren et al. | |
| 3,258,245 | 6/1966 | Alderson | |
| 3,396,905 | 8/1968 | Johnson | |
| 3,468,473 | 9/1969 | Davies et al. | 416/193 R |
| 3,494,539 | 2/1970 | Littleford | 60/226.1 |
| 3,524,712 | 8/1970 | Petrie et al. | 416/193 R |
| 3,549,272 | 12/1970 | Bauger et al. | 416/166 |
| 3,861,139 | 1/1975 | Jones | 60/226.1 |
| 4,012,165 | 3/1977 | Kraig | 415/145 |
| 4,747,900 | 5/1988 | Angus | 416/241 A |
| 4,791,783 | 12/1988 | Neitzel | 60/262 |

FOREIGN PATENT DOCUMENTS 452665 12/1974 U.S.S.R. .......................... 416/193 R

Primary Examiner—Donald E. Stout
Attorney, Agent, or Firm—Jerome C. Squillaro

[57] ABSTRACT

An axial flow compressor for a bypass type jet engine has a low pressure stage which includes a one-piece, annular hoop shroud mounted to the airfoil of each of the rotor blades in the low pressure stage to divide the airflow entering the compressor into an outer, bypass airflow path and an inner airflow path directed to the higher pressure stages of the compressor. The hoop shroud is formed of circumferentially wound, parallel fibers such as silicone carbide fibers embedded in a metal matrix material such as titanium, wherein the volume ratio of the hoop shroud is approximately one-third fibers and two-thirds metal matrix material.

10 Claims, 2 Drawing Sheets

HOOP SHROUD FOR THE LOW PRESSURE STAGE OF A COMPRESSOR

FIELD OF THE INVENTION

This invention relates to compressors for jet engines, and, more particularly, to a low pressure stage in a compressor for a bypass type jet engine having a one-piece, continuous hoop shroud mounted intermediate the root and tip of the airfoil of each rotor blade in the stage.

BACKGROUND OF THE INVENTION

Axial flow compressors are commonly used in bypass-type jet engines to supply compressed air to the combustion chamber. These compressors are typically multi-stage units wherein each stage consists of a bank or row of rotor blades connected to the rotor disk and an adjacent row of stator vanes mounted to the compressor casing. The several stages of the compressor operate in series to gradually increase the pressure of the airflow therethrough in an aft direction for injection into the combustion chamber.

In bypass-type jet engines, only a portion of the air entering the forward end of the compressor passes through its high pressure stages. The rest of the air is ducted around the high pressure stages of the compressor and then later mixed in the exhaust system with the high pressure air before passing to the propelling nozzle of the jet engine.

In order to improve the aerodynamic performance of axial flow compressors for bypass-type jet engines, a flow splitter is sometimes mounted to the airfoil of the rotor blades in a low pressure stage of the compressor intermediate the root and tip of the airfoil. The purpose of the splitter is to divert the airflow at the intake or forward end of the compressor into a low pressure, bypass air stream which is ducted around the high pressure stages of the compressor, and a high pressure, inner air stream which passes into the high pressure stages of the compressor. This split or stratification of the air flow can increase the aerodynamic performance of the jet engine and thus lower fuel consumption.

In the prior art, blade splitters mounted to the airfoil of the rotor blades in the low pressure stages of a compressor have been "part span" shrouds, i.e., short, arcuate-shaped sections of metal alloys welded or otherwise permanently affixed to the airfoil of each rotor blade in the low pressure stage. The ends of the part span shroud of one airfoil abut the ends of the part span shroud of adjacent airfoils so that together the shrouds form an essentially continuous, annular-shaped ring around the entire rotor stage. The abutting ends of the part span shrouds are designed to create a seal therebetween to limit leakage of air between the inner and outer flow paths formed by the shrouds.

The stator vanes in the low pressure stage of the compressor adjacent to the rotor blades are also provided with shrouds similar in construction to those of the rotor blades. Both the part span shrouds of the rotor blades and the shrouds of the stator vanes are formed to engage one another along their facing, circumferential edges to create a seal therebetween. This circumferential seal between the rotating rotor blades and fixed stator vanes is intended to further limit the leakage of air between the inner air flow path and outer or bypass air flow path through the compressor.

Despite their aerodynamic advantages, part span shrouds of the type described above have several mechanical disadvantages. Each part span shroud is essentially deadweight on the airfoil and centrifugal loading produced by rotation of the rotor blades at high speeds induces a correspondingly high bending stress at the shroud-airfoil interface causing high local airfoil stresses. In turn, the centrifugal loads produced by the shrouds are transferred through the airfoils directly to the rotor disk which increases the overall weight of the rotor structure.

The high centrifugal forces applied to the shrouds by rotation of the rotor produces high bending stresses in the shrouds themselves and thus causes relatively large shroud deflections. Relative movement or deflection of the shroud mounted on one rotor blade airfoil with respect to the shroud mounted on an adjacent rotor blade airfoil allows air to leak therebetween. This diminishes the aerodynamic performance, i.e., splitting of the air incoming to the compressor into a low pressure bypass or outer flow and a high pressure or inner flow into the high pressure stages of the compressor.

Leakage of air between the high pressure air flow path through the compressor and the low pressure bypass air flow path can also occur along the contacting circumferential edges of the part span shrouds mounted to the row of rotor blades and the mating shrouds mounted to the adjacent row of stator vanes in the low pressure stage of the compressor. Such relative deflection is typically produced by centrifugal loading and airfoil untwist, i.e., a tendency of the airfoil to straighten under high centrifugal load. This airfoil untwist can cause the contacting shroud surfaces of the rotor blades and stator vanes to "lock up" and hence rub against one another causing additional shroud stresses and possible surface fatigue at the contacting surfaces of the shrouds.

SUMMARY OF THE INVENTION

It is therefore among the objectives of this invention to provide a low pressure stage in a compressor for a bypass type jet engine having a shroud for dividing the flow of air entering the compressor into a bypass, outer air flow path and an inner air flow path through the high pressure stages of the compressor which reduces stresses on the airfoils of the rotor blades, which adds minimal weight to the rotor stage, which produces an effective seal along the rotor stage, which produces an effective seal between the rotor blades and stator vanes of the low pressure stage of the compressor, which is resistant to bending in response to centrifugal loading and which is devoid of surface contact stresses.

These objectives are accomplished in a shroud for the airfoils of the rotor blades in the low pressure stage of a compressor in a bypass type jet engine which comprises a one-piece, continuous, annular-shaped hoop shroud formed of a composite material consisting of elongated fibers embedded in a metal matrix material. The airfoil of each rotor blade in the low pressure stage of the compressor is formed with a notch extending inwardly from its aft edge substantially perpendicular to the longitudinal axis of the airfoil. The hoop shroud is carried within each notch of the airfoils and fixedly mounted thereto by aluminum brazing. The trailing or aft circumferential edge of the hoop shroud is formed with a sealing lip which engages a surface of the stator shroud connected to the forward edge of each airfoil in the adjacent row of stator vanes within the low pressure stage of the compressor.

The lightweight, one-piece annular hoop shroud of this invention provides several mechanical advantages over the part span shrouds employed in the prior art. The continuous, annular construction of the hoop shroud makes it essentially self-supporting on the airfoils of the rotor blades. That is, a minimum amount of weight is added to any one airfoil by the hoop shroud because it is a continuous annular structure instead of a number of individual part span shrouds each mounted to an airfoil as in the prior art. As a result, little or no additional stresses are produced at the airfoil-hoop shroud interface due to the centrifugal forces applied by the rotating rotor structure. In turn, the overall weight of the rotor does not increase because no additional load is transferred from the airfoils to the rotor disk. Additionally, the continuous hoop shroud eliminates all of the joints between abutting ends of adjacent stator shroud. Such joints limited the sealing capability of prior art shrouded, low pressure stages of compressors.

Other advantages of the continuous, hoop shroud of this invention arise from its fiber-reinforced composite construction. In the presently preferred embodiment, the hoop structure is formed of silicone carbide fibers embedded in a titanium metal matrix. The fibers are wound in a circumferential direction, parallel to one another, to form the annular or hoop shape. The volume fraction of the composite material forming the hoop shroud is preferably about two-thirds titanium matrix material and one-third silicone carbide fibers. With this construction, the hoop shroud is temperature and fatigue resistant and undergoes relatively limited deflection under the centrifugal loading and thermal loading applied by rotation of the rotor blades and resulting gas temperatures.

In advanced rotor designs, the rotor blades and rotor disk are integrally formed as a one-piece unit, or, alternatively, the rotor blades are welded to the rotor disk. The radially outward deflection of such rotor blades and rotor discs in response to centrifugal and thermal loading is minimal and can be made to match or equal the total radial deflection of the hoop shroud herein. As a result, little or no centrifugal load is applied by the hoop shroud to the airfoil and/or rotor disk. This reduces the stress on the airfoils and rotor disk.

DESCRIPTION OF THE DRAWINGS

The structure, operation and advantages of the presently preferred embodiment of this invention will become further apparent upon consideration of the following description taken in conjunction with the accompanying drawings, wherein.

DETAILED DESCRIPTION OF THE INVENTION

Figure 1:
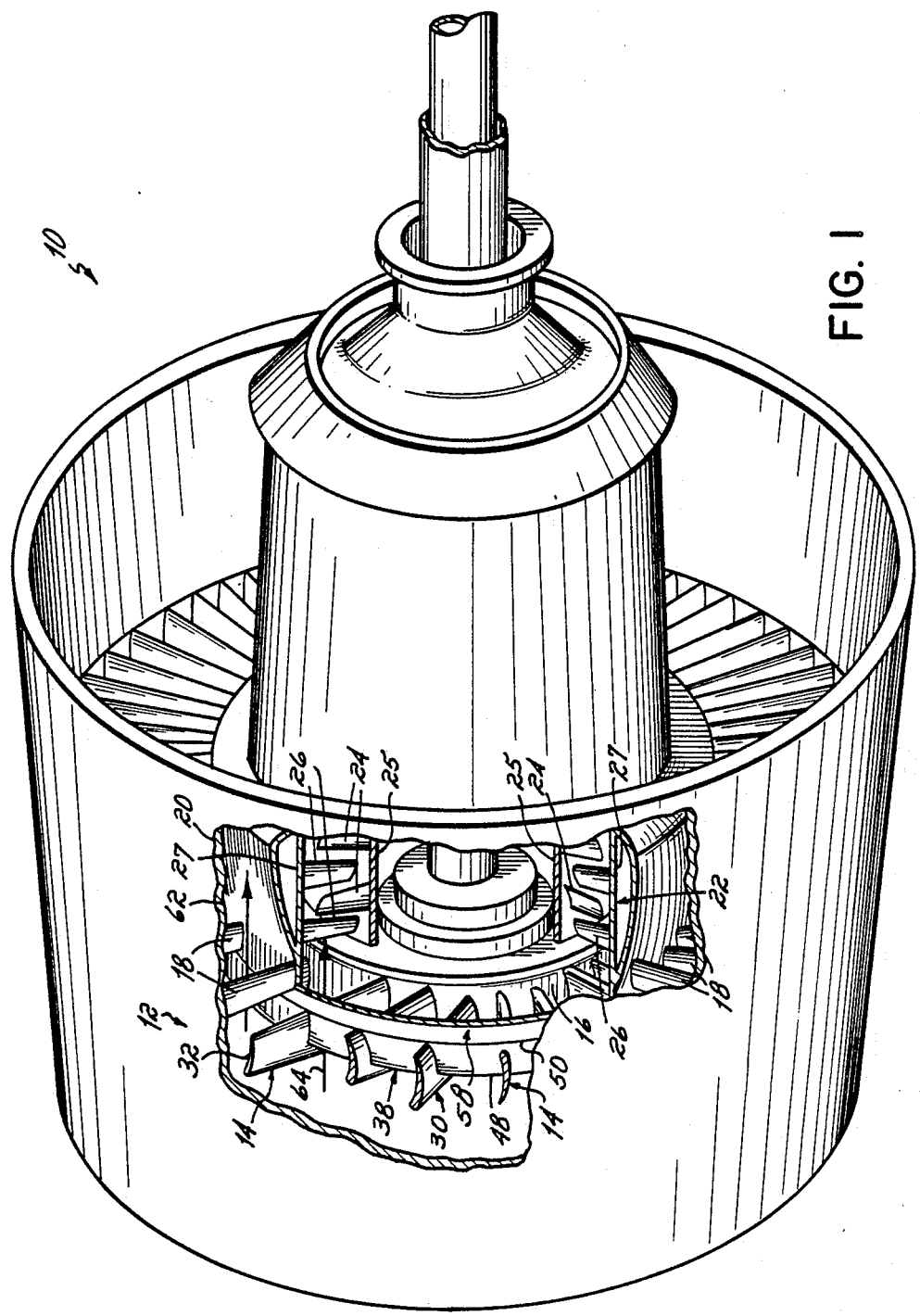
FIG. 1 is a partially cut-away, perspective view of a compressor for a bypass type jet engine including a low pressure stage in which the hoop shroud of this invention is mounted to the airfoils of the rotor blades, and also including an intermediate pressure stage.

Referring now to FIG. 1, a portion of an axial flow compressor 10 for a jet engine is schematically illustrated. The axial flow compressor 10 includes a low pressure stage 12 comprising a row of circumferentially spaced rotor blades 14 carried on a rotor disk 16, and an adjacent row of circumferentially spaced stator vanes 18 carried on the outer casing 20 of the compressor 10. In the presently preferred embodiment, the rotor blades 14 are either integrally formed with the rotor disk 16, e.g., by a machining operation on one piece of material, or the rotor blades 14 are welded to the rotor disk 16.

The compressor 10 also includes additional, higher pressure stages downstream relative to the low pressure stage 12. An intermediate stage 22 is schematically shown in FIG. 1, for purposes of illustration, which comprises a row of circumferentially spaced rotor blades 24 mounted to a rotor disk 25 and an adjacent row of circumferentially spaced stator vanes 26 mounted to an inner compressor case 27 spaced radially inwardly from casing 20.

Figure 2:
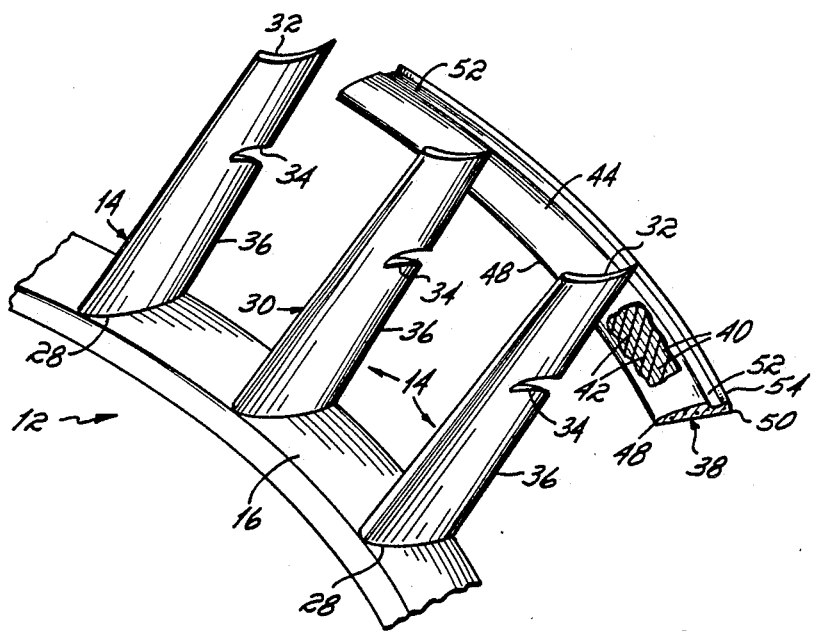
FIG. 2 is an unassembled, perspective view of a portion of the rotor stage and hoop shroud.

Referring now to FIGS. 1 and 2, each of the rotor blades 14 of the low pressure stage 12 comprises a root 28 mounted to the rotor disk 16, an airfoil 30 extending radially outwardly from the root 28 and a blade tip 32 which extends closely adjacent the compressor casing 12. Each rotor blade 14 is formed with a notch 34 in its airfoil 30 which extends axially inwardly from the trailing edge 36 of the airfoil 30 substantially perpendicular to its longitudinal axis.

The notches 34 formed in the airfoil 30 of each rotor blades 24 are adapted to mount a continuous, annular-shaped hoop shroud 38 which extends circumferentially around the entire row or stage of the rotor blades 14. As shown in FIG. 2, the hoop shroud 38 is formed of a plurality of parallel, circumferentially wound fibers such as silicone carbide fibers 40 which are embedded in a metal matrix material 42 such as titanium. In the preferred embodiment, the hoop shroud 38 comprises approximately one-third silicone carbide fibers 40 and two-thirds titanium matrix material 42 by volume.

Figure 4:
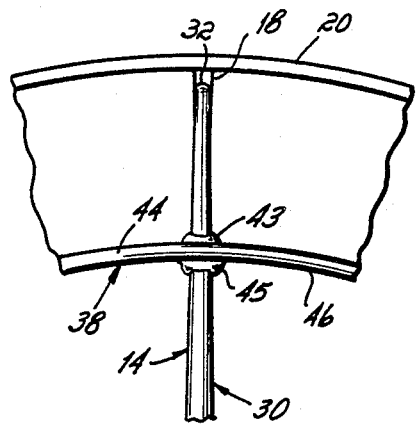
FIG. 4 is a view of the trailing edge of a rotor blade showing the brazed connection between the hoop shroud and airfoil of the rotor blade.

The hoop shroud 38 is formed with an outer surface 44, inner surface 46, a forward end 48 extending within the notches 34 of the rotor blades 14 and an aft end 50 extending axially from the trailing edge 36 of the airfoils 30 of rotor blades 14. The aft end 50 is formed with a circumferentially extending recess 52 which terminates at a sealing tip 54. As shown in FIG. 4, the hoop shroud 38 is mounted to the rotor blades 14 by an aluminum brazing material forming weldments 43, 45 at the outer surface 44 and inner surface 46, respectively, of hoop shroud 38.

Figure 3:
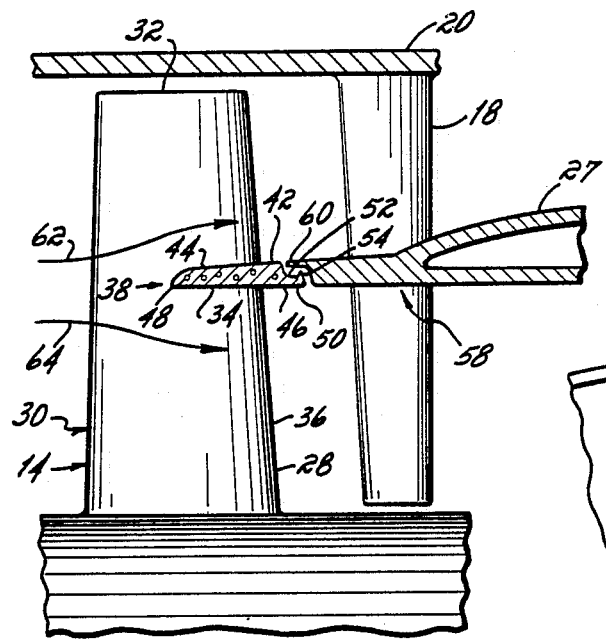
FIG. 3 is a cross sectional view of a portion of the low pressure rotor stage showing the joint connection between the hoop shroud and a stator vane shroud.

As shown in FIGS. 1 and 3, each of the stator vanes 18 in the low pressure stage 12 of the compressor 10 mounts a one-piece, annular stator shroud 58 formed of cast metal or the like. The stator shroud 58 extends forwardly from the leading edge of the inner compressor case 27 and has a forward, circumferential lip 60 positioned closely adjacent the sealing tip 54 of the hoop shroud 38. See FIG. 1.

The purpose of the hoop shroud 38 and the stator shroud 58 is to divert or split the airflow entering the axial flow compressor 10 into an outer path 62 extending between the inner compressor case 27 and outer compressor case 20, and an inner path 64 extending radially inwardly relative to the inner compressor case 27. The outer air flow path 62 forms a bypass path for a portion of the airflow which leads to the exhaust nozzle downstream (not shown). The air diverted into the inner flow path 64 by the hoop shroud 38 enters the higher pressure stages of the compressor 10 such as the intermediate stage 22 shown schematically in FIG. 1 downstream or aft relative to the low pressure stage 12. The position of the sealing tip 54 of hoop shroud 38 relative to the forward edge 60 of stator shroud 58 limits the leakage of air between the inner and outer airflow paths 64, 62 which enhances the aerodynamic performance of the compressor 10.

An important advantage of the hoop shroud 38 of this invention is that its continuous, annular construction makes it essentially self-supporting within the notches 34 of the rotor blades 14. Very little "deadweight" is added to each rotor blade airfoil 30, and this reduces the stresses applied by the hoop shroud 38 to the rotor blades 14 as the rotor disk 16 are rotated.

Additionally, centrifugal forces applied to the hoop shroud 38 tend to deflect it radially outwardly placing the fibers 40, which are circumferentially wound around the hoop shroud 38, in tension. The silicone carbide fibers 40 forming the hoop shroud 38 are extremely strong in tension and therefore the stiffness of the hoop shroud 38 is correspondingly high. As a result, the limited displacement which the hoop shroud 38 undergoes is approximately equal to the radially outward movement or deflection which the rotor blades 14 and rotor disk 16 undergo in response to centrifugal forces and thermal loading, and thus little or no net bending stresses are applied by the hoop shroud 38 to the airfoils 30 of rotor blades 14. In addition, the limited deflection of the hoop shroud 38 reduces its movement with respect to the stator shroud 58 on the stator vanes 18. This enhances the sealing connection between the sealing tip 54 of hoop shroud 38 and the forward edge 60 of stator shroud 58.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best made contemplated for carrying out this invention, but that the invention will include all embodiments falling within the scope of the appended claims.

We claim:

1. Apparatus for dividing the airflow entering a low pressure stage of a jet engine compressor having low and high pressure stages, wherein a stage includes a rotor blade having a tip and root, said apparatus comprising:
    a one-piece, continuous annular hoop shroud bonded to said airfoil directly within a notch formed at a location intermediate the root and tip of the rotor blade;
    said annular hoop shroud forming an outer air flow path for a portion of the air entering the compressor to bypass the higher pressure stages of the compressor, and an inner airflow path for another portion of the air entering the compressor to flow into the higher pressure stages thereof.

2. The apparatus of claim 1 in which said annular hoop shroud is formed of a plurality of circumferentially wound, substantially parallel fibers embedded in a metal matrix material.

3. The apparatus of claim 2 in which said fibers are silicone carbide filaments.

4. The apparatus of claim 2 in which said metal matrix material is titanium metal.

5. The apparatus of claim 2 in which said fibers comprise about one-third of the volume of said annular hoop shroud and said metal matrix material comprises about two-thirds of the volume of said annular hoop shroud.

6. The apparatus of claim 1 in which the low pressure stage of the compressor includes a row of circumferentially spaced stator vanes axially spaced from said rotor blades, each of said stator vanes mounting a stator shroud, said annular hoop shroud being formed with a circumferentially extending sealing tip adapted to engage a surface of said stator shroud mounted to said stator vanes to seal said outer airflow path from said inner airflow path.

7. The apparatus of claim 1 in which said hoop shroud has a top surface and a bottom surface, said hoop shroud being bonded directly within said notch of said airfoil of said rotor blades by a weldment on both said top and bottom surfaces of said hoop shroud, said weldments being formed of aluminum brazing material.

8. A low pressure stage of a compressor in a jet engine, wherein the compressor includes a rotor and a compressor casing, said stage comprising:
    an annular row of circumferentially spaced, rotor blades extending radially outwardly from the rotor toward the casing of the compressor of the jet engine, each of said rotor blades having an airfoil formed with a notch on the aft, trailing edge thereof which is radially spaced from said rotor;
    a one-piece, continuous annular hoop shroud fixedly mounted directly within said notch in each of said rotor blades;
    an annular row of spaced stator vanes extending radially inwardly from the casing of the compressor toward said rotor, said stator vanes mounting a stator shroud in position to sealingly engage said annular hoop shroud mounted to said rotor blades.

9. The apparatus of claim 8 in which said annular hoop shroud is formed of a plurality of circumferentially wound, substantially parallel fibers embedded in a metal matrix material.

10. The apparatus of claim 9 in which said fibers comprise about one-third of the volume of said annular hoop shroud, and said metal matrix material comprises about two-thirds of the volume of said annular hoop shroud.

* * * * *